Dec. 9, 1958          G. REICHERTER          2,863,223
GAUGE FOR TESTING THE ROUNDNESS AND THE
DIAMETER OF CYLINDRICAL WORK PIECES
Filed March 13, 1956

Inventor:
Georg Reicherter
By: Michael S. Striker
agt.

United States Patent Office 2,863,223
Patented Dec. 9, 1958

2,863,223

GAUGE FOR TESTING THE ROUNDNESS AND THE DIAMETER OF CYLINDRICAL WORK PIECES

Georg Reicherter, Esslingen, Germany

Application March 13, 1956, Serial No. 571,258

2 Claims. (Cl. 33—178)

The invention refers to a gauge for testing the roundness and the diameter of cylindrical work pieces and more especially to a gauge of the aforesaid kind which is provided and works with permanent magnets. The known gauges must be transferred by hand into the testing position and must be held there also by hand so that the correct testing position as well as the force with which the gauge is pressed against the work piece depends upon the "feeling" and skill of the man operating the gauge. Thus, considerable errors can arise.

It is the main object of the invention to improve generally upon the devices above referred to and to provide, therefore, a gauge of the general character described with which the correct testing position as well as the force with which the gauge is pressed against the work piece does not depend anymore upon the skill and the "feeling" of the operator but can be determined always in the same manner by the said permanent magnets. The gauge must be simply placed upon the work piece and then it is adjusted automatically so as to occupy the correct testing position without falling down from the work piece.

Another specific object of the invention is to provide an accurate gauge of the character described above which can be manipulated easily and quickly.

Yet another specific object of the invention is to provide a gauge which prevents chips or like disturbing substances or particles which are attracted by, or adhere to, the magnets from disadvantageously influencing the results to be obtained by measuring.

With these and other objects in view, which will appear as the description proceeds, the invention consists of certain novel features of construction as will be particularly pointed out in the appended claims.

Figure 2:
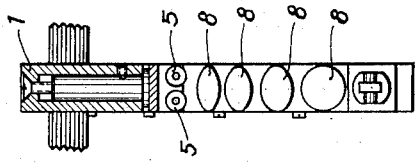
Figure 1:
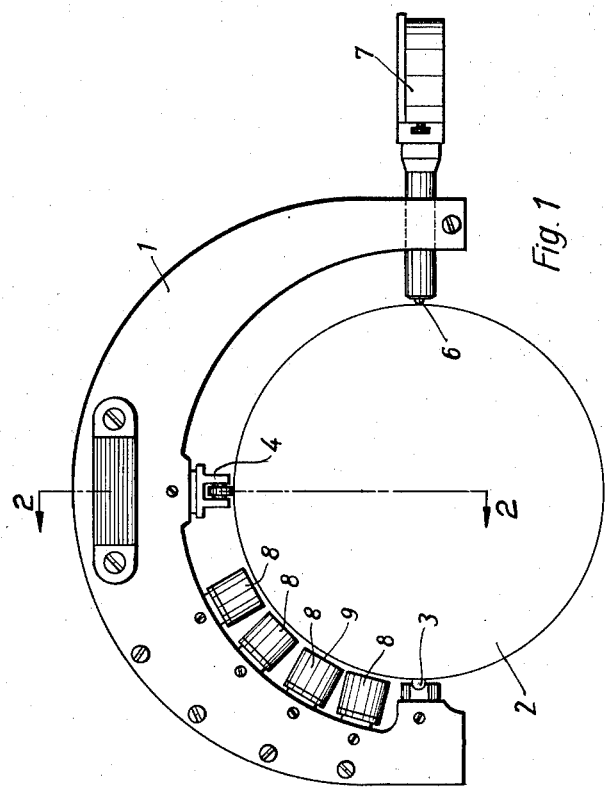
Figure 3:
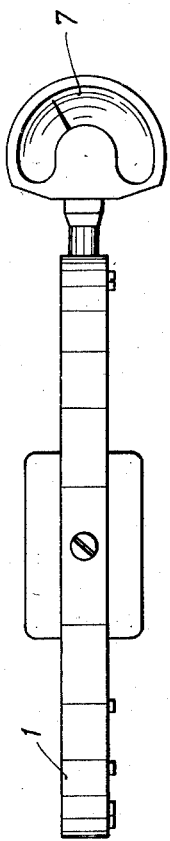

The manner of carrying the invention into effect is hereinafter described by way of example, reference being had to the accompanying drawing, in which Fig. 1 is a side view of a gauge according to the invention, Fig. 2 is a vertical section thereof on the line 2—2 of Fig. 1 and Fig. 3 is a plan view of the gauge shown in Fig. 1.

The gauge 1 contacts the work piece 2 to be measured at three points in a known manner. These points consist of a fixed lateral abutment 3 which is provided with a gauge surface of hardened metal, of an upper abutment 4 which comprises two rolls 5 arranged at right angles to the axis of the work piece to be treated, and of the feeler pin 6 of a dial indicator device 7 opposite the lateral abutment 3. Between the upper abutment 4 and the lateral abutment 3 there are arranged on an arc four permanent magnets 8. Between the permanent magnets 8 and the work piece 2 only a small air gap exists.

When the gauge described above is placed by hand inaccurately, for example, aslant on the work piece 2 to be measured, the permanent magnets 8 become effective and transfer the gauge into the correct testing position on the work piece 2 so that the gauge rests positively on the latter. In this case, the gauge performs generally a small turning or pivotal motion approximatively about the lateral abutment 3, said motion being facilitated by the fact that the upper abutment 4 is constituted by the rolls 5 which are supported in ball bearings (not shown) and which roll upon the work piece 2 approximatively in a direction parallel to the axis of the work piece when the gauge performs its turning or pivotal motion. The feeler pin 6 of the dial indicator 7 is preferably provided with a spherical surface at the end which contacts the work piece so that it can partake of the turning motion without considerable friction. Since the automatic adjustment of the gauge 1 on the work piece 2 takes place in a very short time (wherein the operator must, naturally, release the gauge), the diameter to be measured can be read on the dial almost directly after the gauge 1 has been placed on the work piece.

From the drawings it can be seen, therefore, that the permanet magnets are so arranged that the magnetic flux does not pass through the surfaces of the abutments and of the feeler pin nor generally through the surfaces with which the gauge contacts the work piece to be tested.

With the new gauge it is possible, for example, to determine the diameter of large diameter shafts with an accuracy up to $\frac{1}{1000}$ mm.

The foregoing description is directed solely towards the structure illustrated, but I desire it to be understood that I reserve the privilege of resorting to all mechanical changes to which the device is susceptible, the invention being defined and limited only by the terms of the appended claims.

Having thus described the invention, what I claim as new and desire to secure by Letters Patent is:

1. A gauge for testing the roundness and the diameter of cylindrical work pieces, comprising, in combination, a gauge body, a plurality of feeler members distributed on said gauge body and adapted to engage different parts spaced from one another of the surface of said work piece to be tested, at least one of said feeler members being so constructed as to facilitate a sliding or turning movement of said gauge body around said surface of said work piece to be tested, an additional feeler member adapted to engage a portion of said surface of said work piece to be tested and arranged opposite to one of said first named feeler members, dial means mounted on said gauge body and engaging said additional feeler member so as to be operated by movement thereof radially with respect to said work piece to be tested, and permanent magnetic means connected to the surface of said gauge body facing said work piece to be tested and so distributed thereon that the gauge after having been placed on the work piece to be tested is transferred automatically by said permanent magnetic means into the correct testing position and fixedly maintained therein without being held by the operator, said permanent magnetic means being so arranged that between them and the work piece to be tested on which said gauge rests only a small air gap exists.

2. A gauge for testing the roundness and the diameter of cylindrical work pieces, comprising, in combination, a gauge body, a lateral feeler member, an upper feeler member, said lateral and said upper feeler members being adapted to engage, respectively, a lateral and an upper part of the surface of said work piece to be tested, at least one of said feeler members being so constructed as to facilitate a sliding or turning movement of said gauge body around said surface of said work piece to be tested, an additional feeler member arranged opposite said lateral feeler member and adapted to engage a portion of said surface of said work piece to be tested which is opposite to said lateral part of the surface of said work piece to be tested, dial means mounted on said gauge body and engaging said additional feeler member so as to be operated by movement thereof radially with respect to said work piece to be tested, and permanent magnetic means connected to the surface of said gauge body facing said work piece to be tested and arranged on an arc of a circle between said upper feeler member and said lateral feeler member, said magnetic means being so arranged that between them and the work piece to be tested on which said gauge rests only a small air gap exists.

References Cited in the file of this patent

UNITED STATES PATENTS

| | | |
|---|---|---|
| 1,154,620 | Eitner | Sept. 28, 1915 |
| 1,845,199 | Schnuck | Feb. 16, 1932 |
| 2,542,030 | Hoppe | Feb. 20, 1951 |
| 2,596,322 | Zumwalt | May 13, 1952 |
| 2,671,272 | Bishop | Mar. 9, 1954 |